(12) United States Patent
Iyer et al.

(10) Patent No.: US 11,968,309 B2
(45) Date of Patent: Apr. 23, 2024

(54) SYSTEMS AND METHODS FOR MULTI-FACTOR DIGITAL AUTHENTICATION OF AIRCRAFT OPERATIONS

(71) Applicant: Honeywell International Inc., Morris Plains, NJ (US)

(72) Inventors: Vijayshankaran Iyer, Peoria, AZ (US); Phani Ammi Raju Pothula, Hyderabad (IN); Kovalan Ramana, Hyderabad (IN); G V Bharath Kumar, Hyderabad (IN); Raveendra Reddy Mudimala, Phoenix, AZ (US); Paul Drake, Morris Plains, NJ (US); Lawrence Marsala, Peoria, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 839 days.

(21) Appl. No.: 17/072,297

(22) Filed: Oct. 16, 2020

(65) Prior Publication Data
US 2022/0051571 A1     Feb. 17, 2022

(30) Foreign Application Priority Data
Aug. 17, 2020   (IN) ............... 202041035404

(51) Int. Cl.
*H04L 9/32*     (2006.01)
*H04L 9/40*     (2022.01)

(52) U.S. Cl.
CPC ............ *H04L 9/3247* (2013.01); *H04L 63/08* (2013.01)

(58) Field of Classification Search
CPC .... G08G 5/0013; G08G 5/0052; G06F 21/62; G06F 21/6218; H04L 2209/84;
(Continued)

(56) References Cited

U.S. PATENT DOCUMENTS

| 6,438,468 B1 | 8/2002 | Muxlow et al. |
| 8,656,162 B2 | 2/2014 | Roy et al. |

(Continued)

FOREIGN PATENT DOCUMENTS

| EP | 1 494 164 A2 | 1/2005 |
| EP | 1 494 164 A3 | 2/2006 |

(Continued)

OTHER PUBLICATIONS

European Search Report dated Apr. 26, 2021 in European Application No. 20216746.6 (7 pages).

*Primary Examiner* — Olugbenga O Idowu
(74) *Attorney, Agent, or Firm* — Alston & Bird, LLP

(57) ABSTRACT

Methods and systems for authenticating operations of an aircraft are disclosed. In at least one embodiment, the method may include: receiving, by an aircraft data gateway, a request for an operation of an aircraft from an operations portal; performing a first digital authentication of the request using first digital authentication information; performing a second digital authentication of the request using second digital authentication information, the second digital authentication information being distinct from the first digital authentication information; and executing the operation of the aircraft upon validating the first digital authentication and the second digital authentication.

19 Claims, 4 Drawing Sheets

(58) Field of Classification Search
CPC . H04L 2463/082; H04L 63/083; H04L 63/08;
H04L 63/0861; H04L 9/3226; H04L
9/3231; H04L 9/3247
See application file for complete search history.

(56) References Cited

U.S. PATENT DOCUMENTS

| | | |
|---|---|---|
| 9,308,879 B2 | 4/2016 | Wright et al. |
| 9,600,944 B1* | 3/2017 | Garel ..................... G07C 5/008 |
| 10,410,075 B2 | 9/2019 | Zebley et al. |
| 10,432,612 B2 | 10/2019 | Watson et al. |
| 2017/0093866 A1 | 3/2017 | Ben-Noon et al. |
| 2017/0366360 A9 | 12/2017 | Thompson et al. |
| 2020/0184739 A1 | 6/2020 | Nathan et al. |
| 2020/0358761 A1* | 11/2020 | Ya ....................... H04L 63/0861 |

FOREIGN PATENT DOCUMENTS

| | | |
|---|---|---|
| EP | 3 576 367 A1 | 12/2019 |
| WO | 2016/040920 A1 | 3/2016 |

\* cited by examiner

SYSTEMS AND METHODS FOR MULTI-FACTOR DIGITAL AUTHENTICATION OF AIRCRAFT OPERATIONS

CROSS-REFERENCE TO RELATED APPLICATION(S)

This patent application claims the benefit of priority to Indian provisional Patent Application No. 202041035404, filed on Aug. 17, 2020, the entirety of which is incorporated herein by reference.

TECHNICAL FIELD

Various embodiments of the present disclosure generally relate to software and data transfer operations for an aircraft and, more particularly, to systems and methods for authenticating operations of an aircraft.

BACKGROUND

Modern aircraft require maintenance of avionics and accompanying computer software. Computer software is necessary to implement electronic functionality onboard aircraft including, for example, flight control functions, data collection and storage, cabin functions, weather data applications, in-flight entertainment services, passenger Wi-Fi, and so forth. During aircraft maintenance, operations may be performed such as uploading and installing software onto critical flight systems or downloading flight and maintenance data from the aircraft. Software operations and data operations for each of an aircraft's devices and databases may be routed through an Aircraft Data Gateway (ADG) onboard the aircraft, such as the Honeywell ADG-300. The ADG provides an interface onboard the aircraft from which a user can perform software and data transfer operations for the aircraft's components and databases.

To prevent unauthorized access, modifications, or tampering with aircraft avionics and databases, access to the ADG is typically protected by physically securing the ADG away from potential unauthorized users. For example, the ADG may be located in the aircraft cockpit to prevent access by unauthorized users.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for authenticating operations for an aircraft. Utilizing the systems and methods disclosed herein below, multi-factor digital authentication may be implemented using an authentication server to secure transmission of data between an aircraft and one or more devices at a location remote from the aircraft. An authorized user may then use an operations portal on a remote device to securely transmit software and data operations to one or more aircraft, receive flight data and maintenance records from one or more aircraft, and monitor the progress of software and data operations for one or more aircraft. In some embodiments, an authorized user may automate the process by scheduling operations to be performed at a later time. These techniques may result in a simplified and unique mechanism for aircraft data and software updates.

In one aspect, a computer-implemented method for authenticating operations of an aircraft is disclosed. The method may include: receiving, by an aircraft data gateway, a request for an operation of an aircraft from an operations portal; performing, by the aircraft data gateway, a first digital authentication of the request using first digital authentication information; performing, by the aircraft data gateway, a second digital authentication of the request using second digital authentication information, the second digital authentication information being distinct from the first digital authentication information; and executing, by the aircraft data gateway, the operation of the aircraft upon validating the first digital authentication and the second digital authentication.

In another aspect, a system for authenticating operations of an aircraft is disclosed. The system may include: at least one memory storing processor-readable instructions; and at least one processor configured to access the at least one memory and execute the processor-readable instructions, which when executed by the at least one processor configures the at least one processor to perform a plurality of operations, the operations comprising: receiving, by an aircraft data gateway, a request for an operation of an aircraft from an operations portal implemented on a remote device; performing, by the aircraft data gateway, a first digital authentication information of the request using first digital authentication information; performing, by the aircraft data gateway, a second digital authentication of the request using second digital authentication information, the second digital authentication information being distinct from the first digital authentication information; and executing, by the aircraft data gateway, the operation of the aircraft upon validating the first digital authentication and the second digital authentication.

In yet another aspect, a non-transitory computer-readable medium containing instructions for authenticating operations of an aircraft is disclosed. The instructions may include: receiving, by an aircraft data gateway, a request for an operation of an aircraft from an operations portal; performing, by the aircraft data gateway, a first digital authentication of the request using first digital authentication information; performing, by the aircraft data gateway, a second digital authentication of the request using second digital authentication information, the second digital authentication information being distinct from the first digital authentication information; executing, by the aircraft data gateway, the operation of the aircraft upon validating the first digital authentication and the second digital authentication; determining, by the aircraft data gateway, a progress state of the operation of the aircraft; and sending, by the aircraft data gateway, the determined progress state to the operations portal, the operations portal being implemented on a remote device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
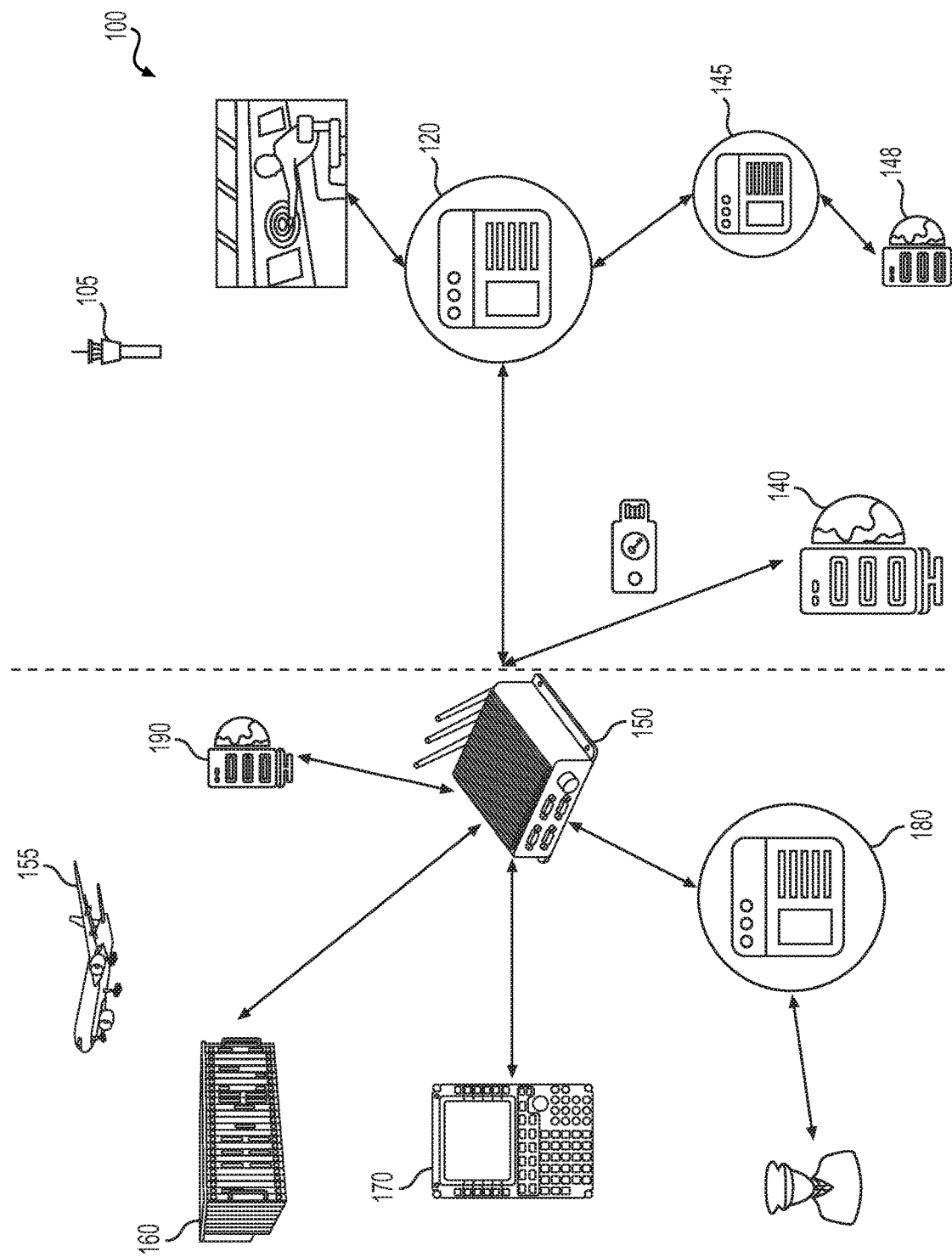
FIG. 1 depicts an exemplary environment in which systems, methods and other aspects of the present disclosure may be implemented.

Various embodiments of the present disclosure generally relate to software and data transfer operations for aircraft and, more particularly, to systems and methods for authenticating operations of an aircraft.

Modern aircraft depend on computerized devices to perform many different functions. For example, in order to upload and download data from an aircraft, or to update and install software on an aircraft, an authorized user may need to bring a portable electronic device onto the aircraft and directly connect to the aircraft's ADG until the upload and download data or update and install software processes are complete. As discussed above, the ADG may be located in the aircraft cockpit to prevent unauthorized access, modifications, or tampering with aircraft avionics and databases. As a result, in order to access the ADG to perform operations such as downloading flight and maintenance record data or installing or updating avionics software, an authorized user may need to physically carry a portable electronic edge device, such as a laptop or tablet, onboard the aircraft and directly connect the edge device to the ADG. Further, in order to view or monitor the status of a loading or downloading operation that is in progress, the authorized user may need to remain physically present with the edge device connected to the ADG. Requiring a user to be physically present in each aircraft (e.g., in the cockpit) to perform software and data operations may be cumbersome, and may result in delays, inconvenience for users, and significantly increased administrative burdens resulting in additional costs, particularly if there is a large fleet of aircraft to be maintained. Further, an unauthorized user who is able to physically access the ADG onboard the aircraft could potentially gain access to critical aircraft systems and data.

For the reasons stated above and for other reasons stated below which will become apparent to those skilled in the art upon reading and understanding the specification, there is a need in the art for alternate systems and methods that will simplify software and data exchange operations on aircraft, lower administrative costs, and improve the user experience while better preventing unauthorized access, modifications, or tampering with aircraft avionics and databases.

In general, the present disclosure describes systems and methods for authenticating operations of an aircraft, and more preferably, authentication operations that are initiated remotely. In one embodiment, a processor in an aircraft system for authenticating operations of a vehicle communications system may receive a request for an operation of an aircraft from a user operations portal implemented on a device remote from the aircraft, perform a first digital authentication (for example, requesting a user to input a password), perform a second digital authentication using authentication data from an authentication server (for example, a challenge-handshake authentication protocol), validate the authentications, and then perform the operations. For instance, the processor may further collect maintenance records or flight data from the airplane and send the records and data to the operations portal for storage on a maintenance database. Furthermore, the processor may generate a progress state for one of the executed operations onboard the aircraft, and then send that progress state to the operations portal for display on the remote device. Therefore, the embodiments of the present disclosure may ensure secure transmission of data and software to and from aircraft, and solve several problems discussed above, such as (1) administrative burden and/or (2) security of critical aircraft databases and avionics.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in an overly limiting sense.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% of a stated or understood value.

The term "exemplary" is used in the sense of "example" rather than "ideal." An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. As used herein, the singular forms "a," "an," and "the" include plural reference unless the context dictates otherwise. The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus.

The phrase "in one embodiment" as used herein does not necessarily refer to the same embodiment throughout the specification, and the phrase "in another embodiment" as used herein does not necessarily refer to a different embodiment. It is intended, for example, that claimed subject matter include combinations of exemplary embodiments in whole or in part.

While this disclosure describes the systems and methods with reference to aircraft, it should be appreciated that the present systems and methods are applicable to reporting vehicle information of a vehicle, including those of drones, automobiles, ships, or any other autonomous and/or Internet-connected vehicle.

Referring now to the appended drawings, FIG. 1 depicts an exemplary environment in which systems, methods and other aspects of the present disclosure may be implemented. The system 100 may include one or more aircraft 155 and one or more remote locations 105 remote from the aircraft 155, such as a control tower, aircraft maintenance center, repair facility, or the like. The location 105 remote from the aircraft 155 may include an operations portal 120, a maintenance records portal 145 and/or database 148, and an authentication server 140. In other embodiments however, the operations portal 120, the maintenance records portal 145 and/or database 148, and the authentication server 140 may be distributed among a plurality of locations, or among a plurality of servers, and not confined to a single location or facility. The aircraft 155 may include an aircraft data gateway 150, aircraft avionics 160, controls or soft switch 170, a local operations portal 180, and one or more aircraft databases 190.

Figure 4:
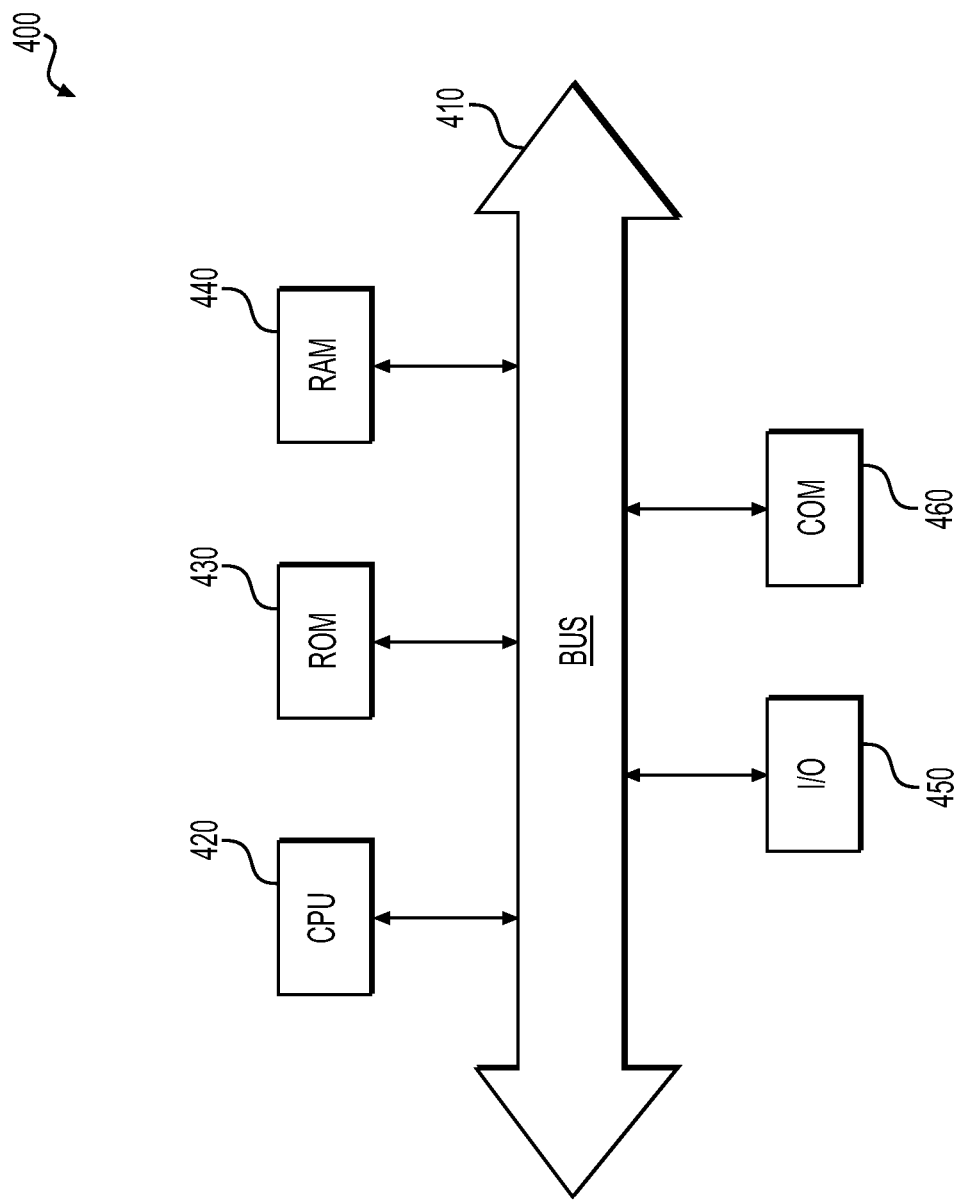
FIG. 4 depicts an exemplary computer device or system, in which embodiments of the present disclosure, or portions thereof, may be implemented.

The operations portal 120 may be implemented on a remote device such as a personal computer, laptop, tablet, mobile device, or the like, which may be consistent with or similar to the computing device depicted in FIG. 4. The operations portal 120 may be capable of receiving operation inputs from a remote user and displaying data, operation progress, and other information to the remote user. The operations portal 120 may be communicably connected, via a network, such as 3G/4G/5G wireless networks, a local area network (LAN), a wide area network (WAN), a private data network, a satellite communications network (e.g., SATCOM), a virtual private network (VPN), and/or a public data network, such as the Internet, to the ADG 150 onboard aircraft 155. In some embodiments, the operations portal 120 may be further communicably connected, via a network to a maintenance records portal and database 145, wherein the operations portal 120 can transmit or receive data, such as aircraft flight or maintenance data, to or from the maintenance records portal and/or database 145.

The system 100 may further receive a request for operations at the ADG 150. The ADG 150 may be, for example, the Honeywell Aerospace® ADG-300. The ADG 150 may comprise components consistent with or similar to those of the computing device depicted in FIG. 4. The ADG 150 may further include Ethernet ports, a Wi-Fi access point, a data loader such as the A615-A, A615-3, or EPIC data loaders, internal data storage, discretes, and so forth. ADG 150 may be communicably connected to an authentication server 140 via a network such that the ADG 150 may request and receive authentication data from the server 140. The ADG 150 may be further communicably connected via a network with a plurality of devices and databases onboard the aircraft. For examples, the ADG 150 may transmit data to and from the aircraft avionics 160, controls/soft switch 170, or local operations portal 180 implemented on an edge device located on the aircraft. The authentication server 140 may be located at a remote location 105. In some embodiments, the authentication server 140 may be located at a third location different from the remote location 105, or may even be located on the aircraft 155.

In some embodiments, the system 100 may include a local operations portal 180 implemented on an edge device such as a laptop, tablet, mobile phone, or the like located onboard the aircraft. The local operations portal 180 may have the same functions and capabilities as the operations portal 120, except that the local operations portal 180 is implemented on an edge device located onboard the aircraft. For example, the local operations portal 180 may be communicably connected to the ADG 150 such that the ADG 150 may receive software and data operations transmitted by the local operations portal 180. Once the system 100 authenticates the operations received at the ADG 150 from the local operations portal 180 based on local user input, and receives second authentication data from the authentication server 140, the ADG 150 may transmit the operations or data to the aircraft avionics 160 and other devices onboard the aircraft.

The ADG 150 may further be configured in some embodiments to receive data pertaining to software installation and update progress and other data from one or more aircraft avionics 160. The ADG 150 may then transmit the received data to any of the operations portal 120 or the local operations portal 180. In some embodiments, the operations portal 120 may be configured to display the transmitted data to a remote user using the operations portal 120. The local operations portal 180 may also be configured to display the transmitted data to a local user using the local operations portal 180. Further, in yet another embodiment, the operations portal 120 may transmit the received data to a maintenance records portal 145 and database 148, without requiring a user to interact with the portal 120. In some embodiments, the process of authenticating data requests and providing data to the operations portal 120 may be automated such that a user does not need to be present at the operations portal 120. In other words, a user may schedule operations to be performed whenever certain predetermined conditions occur. A variety of predetermined conditions are contemplated. For example, a scheduled operation could be set to execute based on time (e.g., every 12 hours), location (e.g., every time the aircraft lands after a flight), aircraft status (e.g., if a system error is detected while the aircraft is grounded), and so forth.

The connections between the ADG 150, operations portal 120, authentication server 140, and other devices may be secured. For example, the connections may be secured using one or more communication-security techniques such as, but not limited to, Secure Sockets Layer (SSL), Two Way SSL, Web Socket Secure, Transport Layer Security (TLS), Secure Shell (SSH), Virtual Private Network (VPN), Layer 2 Tunneling Protocol (L2TP), IP Security (IPSec), Internet Key Exchange version 2 (IKEv2), Point-to-Point Tunneling Protocol (PPTP), Trusted Computer System Evaluation Criteria (TCSEC)/Orange Book techniques, ISO/IEC 15443, 15408 and/or 17799 techniques, public/private key techniques such as the RSA algorithm, and other cryptographic algorithms.

With continuing reference to FIG. 1, the one or more aircraft databases 190 may be located onboard aircraft 155 and may be configured to store data. The aircraft databases 190 may be any type of database, including relational databases, non-relational databases, file-based databases, and/or non-file-based databases, among others. The one or more aircraft avionics 160 may include one or more of a flight management system, communications system, navigation system, fuel systems, flight recorders, weather systems, collision avoidance systems, monitoring systems and other essential components of an aircraft. The one or more aircraft avionics 160 may also include non-critical components, for example, internal lighting systems, passenger entertainment systems and the like.

Figure 2:
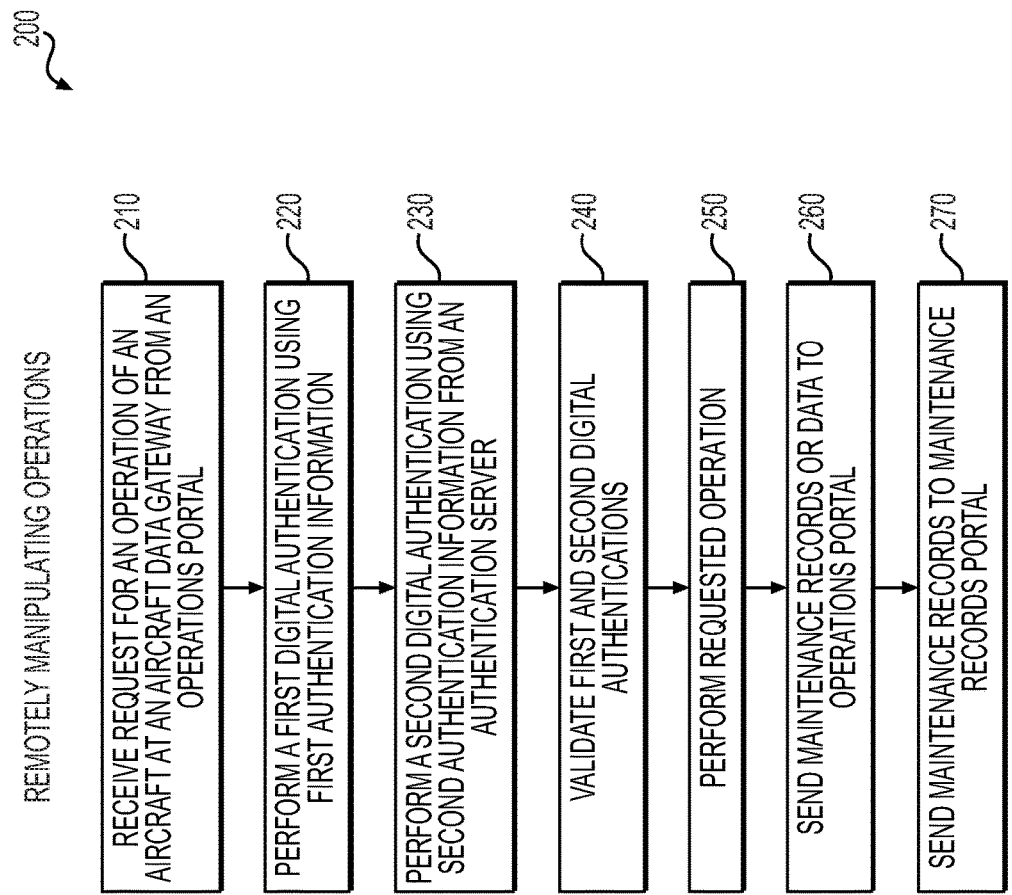
FIG. 2 depicts a flowchart illustrating an exemplary method of remotely initiating, authenticating and monitoring operations of an aircraft, according to one or more embodiments.

FIG. 2 depicts a flowchart illustrating an exemplary method of remotely initiating, authenticating and monitoring operations of an aircraft, according to one or more embodiments. Method 200 may be performed by one or more components of the system 100 described above in reference to FIG. 1. In step 210, a processor of an ADG 150 located on an aircraft 155 may receive a request for an operation of an aircraft from an operations portal, for example, an operations portal 120 at a location 105 remote from the aircraft 155. It should be noted that such a request may be received also from a local operations portal 180. In some embodiments, the operation may be a software operation, for example, new software installation, an update to existing software, or removal of software currently installed on one or more devices located on the aircraft 155 and in communication with the ADG 150, for example, the aircraft avionics 160. In other embodiments, the operation may be a data operation. For example, the ADG 150 may receive a request to download flight or maintenance data from one or more aircraft databases 190 onboard the aircraft 155. The data operation may also be a request to upload data, for example, a request to upload in-flight movie data onto one or more aircraft databases 190 such that a passenger seat display device may be able to access the movie data for later viewing during aircraft flight.

In step 220, the processor of the ADG 150 may perform a first digital authentication on the request using a first digital authentication information. For example, the first digital authentication information may be a password associated with an authorized user and stored on a database. The processor of the ADG 150 may receive a first authentication input data, for example user password input data, from the operations portal 120. As will be explained below, the processor of the ADG 150 may, in step 240, verify the authentication by comparing the received first authentication input data with the first digital authentication information, for example, determining whether the password associated with the authorized user matches the password input data received from the operations portal 120. In some embodiments, the first digital authentication information may comprise biometric information associated with an authorized user and stored on a database, for example, user fingerprint data. The processor of the ADG 150 may further be capable of receiving user fingerprint input data from an operations portal 120 capable of accepting a fingerprint input from a user. The processor of the ADG 150 in step 240 thus may verify the authentication by comparing the received user fingerprint data from the operations portal 120 with the authorized user fingerprint data stored on a database. In other embodiments, the first digital authentication information may comprise data that corresponds to user data encoded within barcode on an authorized user's ID, a FOB, a key or other physical security device in the authorized user's possession. The operations portal 120 or the local operations portal 180 may be configured to detect and receive data stored on such physical security devices.

In step 230, the processor of the ADG 150 may perform a second digital authentication on the request using a second digital authentication information that is different from the first digital authentication in step 220. To that end, the processor of the ADG 150 may receive a second authentication input data, in addition to the first authentication input data received for the first authentication, from the operations portal 120. The second authentication input data may be any type of data discussed above regarding the first authentication input data, but may be different from the first authentication input data. For example, if the first authentication input data is a password, the second authentication input data may be a different type of authentication input data such as user biometrics data. The second digital authentication information may be stored on an authentication server 140 in communication with the ADG 150 via a network. The ADG 150, upon receiving the request for an operation of an aircraft in step 210, may request the second digital authentication information from the authentication server 140, and then receive the second digital authentication information from the authentication server 140. In some embodiments, the second digital authentication information may comprise data that is part of a challenge-handshake authentication protocol (CHAP), such that communications between the ADG 150 and authentications server 140 are further protected from unauthorized access. For example, the authentication server 140, upon receiving an authentication request, may send a challenge packet or message to the ADG 150. The ADG 150 may then respond by sending a value with a one way hash function to the authentication server 140. The authentication server 140 may then compare the value received by the ADG 150 with its own calculated hash value. If the values match, the request is authorized and the authentication server 140 transmits second authentication information to the ADG 150. In other embodiments, the first digital authentication information may comprise password data and the second digital authentication information may comprise biometric data. The connection and authentication information transferred between the ADG 150 and the authentication server 140 may further be encrypted and secured using communication-security techniques such as, but not limited to, Secure Sockets Layer (SSL), Transport Layer Security (TLS), Secure Shell (SSH), Virtual Private Network (VPN), Layer 2 Tunneling Protocol (L2TP), IP Security (IPSec), Internet Key Exchange version 2 (IKEv2), Point-to-Point Tunneling Protocol (PPTP), Trusted Computer System Evaluation Criteria (TCSEC)/Orange Book techniques, ISO/IEC 15443, 15408 and/or 17799 techniques, public/private key techniques such as the RSA algorithm, and other cryptographic algorithms. In this manner, a secure multi-factor authentication system may be created using the ADG 150 onboard the aircraft 155.

In step 240, the processor of the ADG 150 may validate the first and second digital authentications. In some embodiments, the validation of the first and second digital authentications may occur simultaneously. The processor may compare the first and second digital authentication information with the first and second authentication input data received from the operations portal 120, and based on that comparison, determine whether the operation is valid/authorized and should therefore be executed.

In step 250, after the requested operation has been authenticated by validating the first and second digital authentications, the processor of the ADG 150 may perform the requested operation. In some embodiments, the operation may be a software operation, for example, an operation to install, update, or remove software on one or more aircraft avionics 160. In other embodiments, the operation may be a data operation, for example, a data operation to upload or download aircraft maintenance data stored on one or more aircraft databases 190.

In step 260, the processor of the ADG 150 may send the requested data to the operations portal 120, the requested data comprising, for example, maintenance records or other data. Prior to sending the requested data, the processor of the ADG 150 may request the data from one or more aircraft databases 190 onboard the aircraft 155. In response to this request, the one or more aircraft databases 190 may send the requested data to the ADG 150. The processor of the ADG 150 may then transmit the received maintenance or other data records to the operations portal 120. In step 270, the operations portal 120 may further transmit the received maintenance or other data records to a maintenance records portal 145 for storage on a maintenance records database 148 at a location 105 remote form the aircraft 155.

The operations portal 120 may further be configured to display a status of the data or software operation based on the maintenance or other data records received from the ADG 150. For example, the operations portal 20 may inform a user via a display of the operations portal 120 that a software operation, for example a data download operation, is 50% complete. The operations portal 120 may be configured to communicate with a plurality of aircraft, request multiple operations for the plurality of aircraft, and display a status of each of the requested data or software operations for the plurality of aircraft simultaneously.

Figure 3:
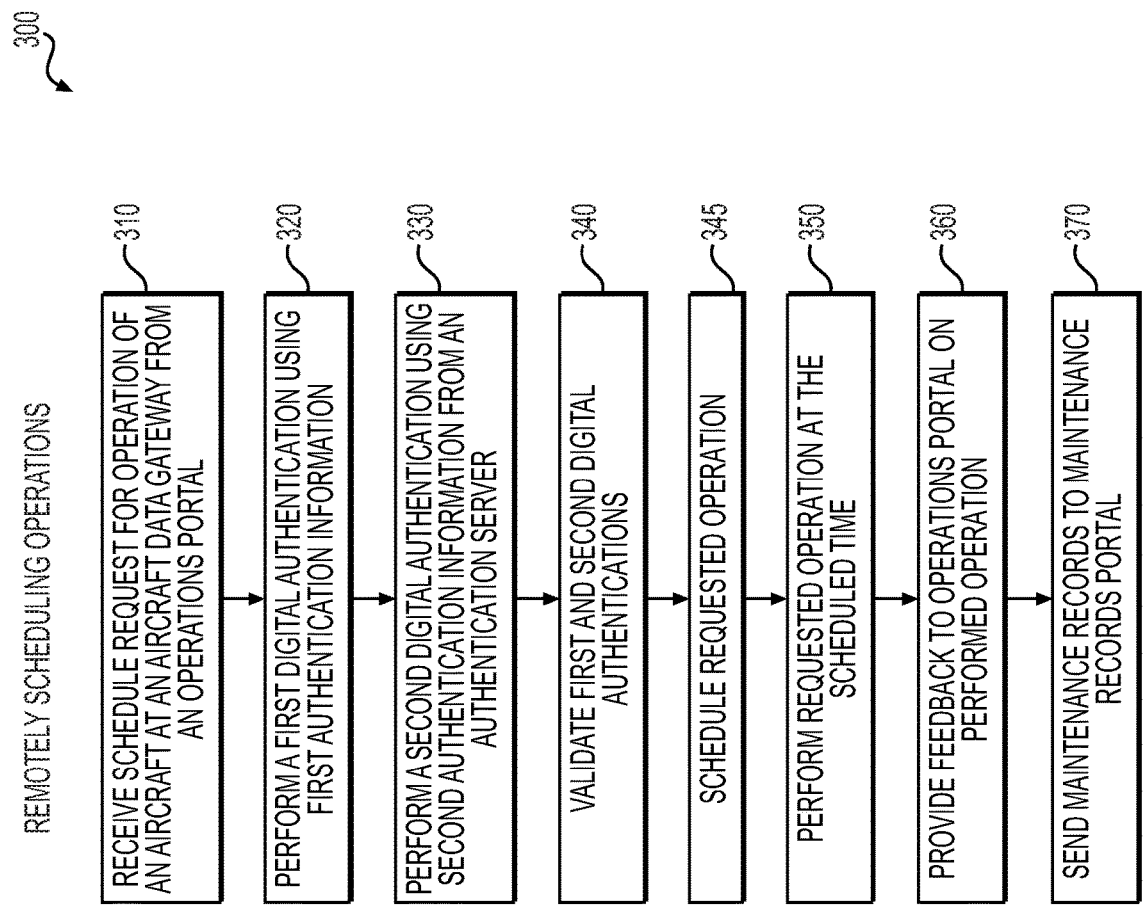
FIG. 3 depicts a flowchart illustrating an exemplary method of scheduling, authenticating, and monitoring remote operations of an aircraft, according to one or more embodiments.

FIG. 3 depicts a flowchart illustrating an exemplary method of scheduling, authenticating, and monitoring remote operations of an aircraft, according to one or more embodiments. Method 300 may be performed by one or more components of the system 100 described above in reference to FIG. 1. In step 310, a processor of an ADG 150 located on an aircraft 155 may receive a request for a scheduled operation of the aircraft 155 from an operations portal, for example, an operations portal 120 at a location 105 remote from the aircraft 155. It should be noted that such a request may be received also from a local operations portal 180. In some embodiments, the request may be received from a local operations portal 180 located onboard the aircraft 155. Prior to step 310, a user of the operations portal 120 or the local operations portal 180 may schedule an operation to be performed at the aircraft 155. The operations portal 120 or the local operations portal 180 may then send a request for the scheduled operation to the ADG 150, and the ADG 150 may perform multi-factor authentication on the request. In some embodiments, the multi-factor authentication may be performed each time a request for a scheduled operation is received from the operations portal 120 or the local operations portal 180. The ADG 150 may then schedule the operation once the request is authenticated (e.g., step 345), and perform the operation at the scheduled time (e.g., step 350). However, it should be noted that, in an alternative embodiment, the ADG 150 may first update or synchronize its schedule of operations based on the received request for a scheduled operation, and the multi-factor authentication may be performed at the time of each scheduled operation (i.e., at the scheduled time).

In one embodiment, the scheduled operation may be a data transfer operation, for example, the ADG 150 may receive a request to schedule a download of flight or maintenance data from one or more aircraft databases 190 onboard aircraft 155. The scheduled data transfer operation may also be a request to schedule upload of data, for example, a request to schedule an upload of in-flight movie data onto aircraft database 190 that a passenger seat display device may be able to access for later viewing during flight. As another example, the request may be to schedule a software/firmware update, for example, a request to schedule an update of certain software/firmware installed in one or more components/devices of the aircraft 155.

In step 320 the processor of the ADG 150 may perform a first digital authentication on the request for a scheduled operation using a first digital authentication information similar to those described in reference to step 220 of FIG. 2. For example, the first digital authentication information may be a password associated with an authorized user and stored on a database. The processor of the ADG 150 may receive a first authentication input data, for example user password input data, from the operations portal 120. The processor of the ADG 150 may, in step 340, verify the authentication by comparing the received first authentication input data with the first digital authentication information, for example, determining whether the password associated with the authorized user matches the password input data received from the operations portal 120. In some embodiments, the first digital authentication information may comprise biometric information associated with an authorized user and stored on a database, for example, user fingerprint data. The processor of the ADG 150 may further be capable of receiving user fingerprint input data from an operations portal 120 capable of accepting a fingerprint input from a user. The processor of the ADG 150 in step 340 thus may verify the authentication by comparing the received user fingerprint data from the operations portal 120 with the authorized user fingerprint data stored on a database. As discussed above in reference to FIG. 2, in other embodiments, the first digital authentication information may comprise data that corresponds to user data encoded within barcode on an authorized user's ID, a FOB, a key or other physical security device in the authorized user's possession. The operations portal 120 or the local operations portal 180 may be configured to detect and receive data stored on such physical security devices.

In step 330, the processor of the ADG 150 may perform a second digital authentication on the request using a second digital authentication information that is different from the first digital authentication in step 320. To that end, the processor of the ADG 150 may receive a second authentication input data, in addition to the first authentication input data received for the first authentication, from the operations portal 120. The second authentication input data may be any type of data discussed above regarding the first authentication input data, but may be different from the first authentication input data. For example, if the first authentication input data is a password, the second authentication input data may be a different type of authentication input data such as user biometrics data. The second digital authentication information may be stored on an authentication server 140 in communication with the ADG 150 via a network. The ADG 150, upon receiving the request for a scheduled operation in step 310, may request the second digital authentication information from the authentication server 140, and then receive the second digital authentication information from the authentication server 140. In some embodiments, the second digital authentication information may comprise that is part of a challenge-handshake authentication protocol (CHAP). In other embodiments, the first digital authentication information may comprise a password and the second digital authentication information may comprise a biometric input. The connection and authentication information transferred between the ADG 150 and the authentication server 140 may further be encrypted and secured using communication-security techniques discussed above in reference to FIG. 2. In this manner, a multi-factor authentication system may be created using the ADG 150 onboard the aircraft 155.

In step 340, the processor of the ADG 150 may validate the first and second digital authentications. The validation may be performed in a manner similar to that discussed in reference to step 240 of FIG. 2. In some embodiments, the validation of the first and second digital authentications may occur simultaneously.

In step 345, the processor of the ADG 150 may schedule the requested operation at the time indicated in the request. In step 350, the processor of the ADG 150 may perform the operation at the scheduled time. The scheduled operation in some embodiments may be a recurring operation, for example, an operation that is performed at a set time each day. It will be appreciated then that the scheduling of recurring operations will significantly reduce administrative burden. In some embodiments, the scheduled operation may occur whenever a specific condition is met. For example, an operation could be scheduled to be executed each time the aircraft 155 lands after a flight, for example. In such a scenario, the scheduled operation could be a data operation in which flight data from one or more aircraft databases 190 and avionics systems 160 is downloaded to the operations portal 120 each time the aircraft 155 lands after a flight.

In step 360, the processor of the ADG 150 may provide feedback to the operations portal 120 or the local operations portal 180 (e.g., whichever operations portal that requested the scheduled operation). In some embodiments, feedback may be provided to an operations portal that is different from the portal that requested the operation. For example, ADG 150 may receive a request for a scheduled operation from portal 120, and provide feedback regarding the scheduled operation to local operations portal 180. The feedback may comprise, for example, the status of a scheduled software operation such as a scheduled software update. For example, the operations portal 120 may inform the remote user via a display that a scheduled software operation has been completed, is in progress, or has not occurred or failed. The operations portal 120 may be configured to communicate with a plurality of aircraft via the respective ADGs 150, request multiple operations for the plurality of aircraft, and display statuses of data or software operations requested for the plurality of aircraft simultaneously. Further, in addition to the feedback data, the operations portal 120 may also receive data that has been requested to be downloaded (e.g., maintenance data, flight data, etc.).

In step 370, the operations portal 120 may transmit data received from the aircraft 155 and transmit the data to the maintenance records portal 145 for storage on a maintenance records database 148. The data transmitted to the maintenance records portal 145 may comprise maintenance records or other data (e.g., flight data) received from the ADG 150 of the aircraft 155.

As discussed above, a user of the operations portal 120 may schedule and manage operations to be performed at one or more aircraft 155 securely, by communicating with the ADGs 150 of the respective aircraft with each request for an operation being authenticated in multiple stages. In addition to requesting and scheduled operations, the user may manage scheduled operations by logging onto the operations portal 120 and modifying the scheduled operations (e.g., canceling or modifying existing scheduled operations). Upon the user modifying a scheduled operation, the updated schedule may be synchronized with the ADG 150. Further, a request to modify or update an existing scheduled operation may be authenticated via the multi-factor authentication technique discussed above.

FIG. 4 depicts a high-level functional block diagram of an exemplary computer device or system 400, in which embodiments of the present disclosure, or portions thereof, may be implemented, e.g., as computer-readable code being executed by the computer device or system 400. Additionally, each of the exemplary computer servers, databases, user interfaces, modules, and methods described above with respect to FIGS. 1-3 can be implemented in device 400 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-3.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-3, may be implemented using one or more of the device 400.

As shown in FIG. 4, the device 400 may include a central processing unit (CPU) 420. CPU 420 may be any type of processor device including, for example, any type of special purpose or a general-purpose microprocessor device. As will be appreciated by persons skilled in the relevant art, CPU 420 also may be a single processor in a multi-core/multi-processor system, such system operating alone, or in a cluster of computing devices operating in a cluster or server farm. CPU 420 may be connected to a data communication infrastructure 410, for example, a bus, message queue, network, or multi-core message-passing scheme.

Device 400 also may include a main memory 440, such as, for example, random access memory (RAM), and also may include a secondary memory 430. Secondary memory 430, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 430 may include other similar means for allowing computer programs or other instructions to be loaded into device 400. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 400.

Device 400 also may include a communications interface ("COM") 460. Communications interface 460 allows software and data to be transferred between device 400 and external devices. Communications interface 460 may include a modem, a network interface (such as an Ethernet card), a communications port, a PCMCIA slot and card, or the like. Software and data transferred via communications interface 460 may be in the form of signals, which may be electronic, electromagnetic, optical, or other signals capable of being received by communications interface 460. These signals may be provided to communications interface 460 via a communications path of device 400, which may be implemented using, for example, wire or cable, fiber optics, a phone line, a cellular phone link, an RF link, or other communications channels.

The hardware elements, operating systems and programming languages of such equipment are conventional in nature, and it is presumed that those skilled in the art are adequately familiar therewith. Device 400 also may include input and output ports 450 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

After reading this description, it will become apparent to a person skilled in the relevant art how to implement embodiments of the present disclosure using these or other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

It should be appreciated that in the above description of exemplary embodiments of the present description, various features of the present description are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of the present description.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the present disclosure, and it is intended to claim all such changes and modifications as falling within the scope of the present disclosure. For example, functionality may be added or deleted from the block diagrams and operations may be interchanged among functional blocks. Steps may be added to, deleted from, or repeated, in methods described herein, while remaining within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. It is intended that the specification and examples be considered as exemplary only, with a true scope and spirit of the disclosure being indicated by the following claims.

What is claimed is:

1. A computer-implemented method for authenticating operations of an aircraft, the method comprising:
  receiving, by an aircraft data gateway, a request for an operation of an aircraft from an operations portal;
  performing, by the aircraft data gateway, a first digital authentication of the request using first digital authentication information;
  performing, by the aircraft data gateway, a second digital authentication of the request using second digital authentication information, the second digital authentication information being distinct from the first digital authentication information;
  executing, by the aircraft data gateway, the operation of the aircraft upon validating the first digital authentication and the second digital authentication;
  determining, by the aircraft data gateway, a progress state of the execution of the operation based at least in part on a communication with the aircraft;
  sending, by the aircraft data gateway, the progress state to the operations portal, the operations portal being implemented on a remote device and configured to display the determined progress state on the operations portal for a plurality of aircraft; and
  sending, by the aircraft data gateway, maintenance data related to the operation to a maintenance record portal remotely located from the aircraft.

2. The computer-implemented method of claim 1, further comprising:
  sending, by the aircraft data gateway, data to the operations portal as a result of the executed operation, the data comprising data stored on one or more databases located on the aircraft.

3. The computer-implemented method of claim 2, wherein the data comprises maintenance records data.

4. The computer-implemented method of claim 1, further comprising:
  identifying, by the aircraft data gateway, a predetermined condition specified in the request; and
  determining, by the aircraft data gateway, that the predetermined condition has been met,
  wherein the operation is a scheduled operation, and wherein the scheduled operation is performed upon determining that the predetermined condition has been met.

5. The method of claim 1, wherein the operation of the aircraft comprises at least one of:
  avionics software installation; and
  download of maintenance and/or flight data.

6. The method of claim 1, wherein the first digital authentication information comprises one or more passwords and the second digital authentication information comprises biometrics data.

7. The method of claim 1, wherein the first digital authentication information is received from a database onboard the aircraft and the second digital authentication information is received from a server remotely located from the aircraft.

8. A system for authenticating operations of an aircraft, the system comprising:
  at least one memory storing processor-readable instructions; and
  at least one processor configured to access the at least one memory and execute the processor-readable instructions, which when executed by the at least one processor configures the at least one processor to perform a plurality of operations, the operations comprising:
    receiving, by an aircraft data gateway, a request for an operation of an aircraft from an operations portal implemented on a remote device;
    performing, by the aircraft data gateway, a first digital authentication information of the request using first digital authentication information;
    performing, by the aircraft data gateway, a second digital authentication of the request using second digital authentication information, the second digital authentication information being distinct from the first digital authentication information;
    executing, by the aircraft data gateway, the operation of the aircraft upon validating the first digital authentication and the second digital authentication,
    determining, by the aircraft data gateway, a progress state of the execution of the operation based at least in part on a communication with the aircraft;
    sending, by the aircraft data gateway, the progress state to the operations portal, the operations portal being implemented on a remote device and configured to display the determined progress state on the operations portal for a plurality of aircraft; and
    sending, by the aircraft data gateway, maintenance data related to the operation to a maintenance record portal remotely located from the aircraft.

9. The system of claim 8, the operations further comprising:
  sending, by the aircraft data gateway, data to the operations portal as a result of the executed operation, the data comprising data stored on one or more databases located on the aircraft.

10. The system of claim 9, wherein the data comprises maintenance records data.

11. The system of claim 8, wherein the operation of the aircraft comprises at least one of:
  avionics software installation; and
  download or maintenance and/or flight data.

12. The system of claim 8, wherein the first digital authentication information comprises one or more user names and passwords.

13. The system of claim 8, wherein the second digital authentication information comprises data pertaining to a challenge-handshake authentication protocol.

14. The system of claim 8, wherein the operations portal implemented on the remote device displays the determined progress state.

15. The system of claim 8, wherein the request for the operation of the aircraft comprises a request for scheduling an operation to occur at a later time.

16. The system of claim 8, wherein the operations portal implemented on the remote device transmits aircraft maintenance records to an aircraft maintenance records portal as a result of the executed operation.

17. The system of claim 16, wherein the maintenance records portal stores the received aircraft maintenance records onto a maintenance records database.

18. A non-transitory computer-readable medium containing instructions for authenticating operations of an aircraft which, when executed by at least one processor, cause the at least one processor to perform operations comprising:
- receiving, by an aircraft data gateway, a request for an operation of an aircraft from an operations portal;
- performing, by the aircraft data gateway, a first digital authentication of the request using first digital authentication information;
- performing, by the aircraft data gateway, a second digital authentication of the request using second digital authentication information, the second digital authentication information being distinct from the first digital authentication information;
- executing, by the aircraft data gateway, the operation of the aircraft upon validating the first digital authentication and the second digital authentication;
- determining, by the aircraft data gateway, a progress state of the operation of the aircraft;
- determining, by the aircraft data gateway, a progress state of the execution of the operation based at least in part on a communication with the aircraft;
- sending, by the aircraft data gateway, the progress state to the operations portal, the operations portal configured to display the determined progress state on the operations portal for a plurality of aircraft, the operations portal being implemented on a remote device, and
- sending, by the aircraft data gateway, maintenance data related to the operation to a maintenance record portal remotely located from the aircraft.

19. The method of claim 5, wherein the progress state of the execution of the operation that is determined by the aircraft data gateway is indicative of a progress of the at least one of the avionics software installation; and the download of maintenance and/or flight data.

* * * * *